Feb. 6, 1934.     H. S. NEWCOMER     1,945,951
AFOCAL OBJECTIVE
Filed Jan. 30, 1930     4 Sheets—Sheet 1

INVENTOR
Harry Sidney Newcomer
BY
Hammond & Littell
ATTORNEYS

Feb. 6, 1934.   H. S. NEWCOMER   1,945,951
AFOCAL OBJECTIVE
Filed Jan. 30, 1930   4 Sheets-Sheet 2

INVENTOR
Harry Sidney Newcomer
BY
Hammond + Littell
ATTORNEYS

INVENTOR
Harry Sidney Newcomer
BY
Hammond & Littell
ATTORNEYS

Feb. 6, 1934.   H. S. NEWCOMER   1,945,951
AFOCAL OBJECTIVE
Filed Jan. 30, 1930   4 Sheets-Sheet 4

INVENTOR
Harry Sidney Newcomer
BY
Hammond & Littell
ATTORNEYS

Patented Feb. 6, 1934

1,945,951

UNITED STATES PATENT OFFICE 1,945,951

AFOCAL OBJECTIVES

Harry Sidney Newcomer, New York, N. Y.

Application January 30, 1930. Serial No. 424,599

51 Claims. (Cl. 88—57)

The present invention has for an object to provide an improved afocal anamorphosing objective. This application is a continuation in part of my application for Letters Patent, Serial No. 344,034, filed March 2, 1929. It represents in part certain improvements over the arrangements described in that application.

There is a demand in the motion picture industry for films presenting on projection a field of laterally extended area. This can be accomplished using the present standard motion picture film without increasing the width of the film, if there is introduced into the camera and projector lens systems suitable anamorphosing objectives whereby a relatively wide scene can be condensed in its lateral dimensions as focused on the motion picture film in the camera and restored in projection to produce on the screen a wide field.

The present invention has been developed more particularly in connection with the production of an afocal anamorphosing objective for use alternatively in the camera for taking and in the projector for projecting motion pictures for this purpose. For convenience such an embodiment of the invention will be described to illustrate the principles of the invention.

The system of lenses to be described is afocal, that is to say it is so designed that a pencil of rays coming from an infinite distance and therefore incident parallel upon the afocal objective will be also parallel when emerging from the objective. For purposes of focusing on objects not at an infinite distance provision is made for moving one of the component parts of the objective toward the other so that the so-called convergence of the rays is not changed by passing through the anamorphosing objective.

In order that the negative shall have good definition and the projected picture be sharp and free from color fringes and distortion, it is desirable that the lens system be very thoroughly corrected for geometrical and color aberrations. Because of the different optical and light conditions which may obtain in taking and in projection it may be necessary or desirable to alter the lens system so as to emphasize one or the other of the corrections or shift the region of the corrections to suit the conditions of use in order that optimum results may be had. The present invention provides for making the necessary correction.

The nature and objects of the invention will be better understood from a description of an illustrative embodiment for the purpose of which description reference should be had to the accompanying drawings forming a part hereof and in which—

In the above plots all wave lengths are plotted on a logarithmic scale.

The objective to be more particularly described for the purposes of illustration consists of a positive lens 1 and a negative lens 2. The two lenses or members are separated normally by such a distance that a para-axial pencil of parallel rays incident on the lens 1 leaves the lens 2 as a para-axial pencil of parallel rays. For convenience in fixing positive and negative directions and otherwise for clearness of description we will assume that the light is incident parallel on the exterior surface of the positive lens of the anamorphosing objective as if it were a beam projected through a film and focused from this by an ordinary objective upon an infinitely distant screen, the anamorphosing objective being placed in front of, or on the screen side of, the ordinary objective. Distances in the direction of the screen will be taken as positive but in speaking of the cambrures of the positive and negative members of the anamorphosing objective they will be considered as increasing in algebraic value, as the exterior surface of either member becomes more convex (or less concave). The cambrure of a simple lens is numerically equal to the strength of its first surface in diopters minus the strength of its second surface in diopters, both being given their appropriate signs. Throughout this specification, in defining and calculating cambrures, the first surface of the above definition will always be the surface of the member which is on the exterior of the objective. When the member is composed of several elements the cambrure will be calculated as a function of its first and last surfaces only.

If the direction of propagation of light be taken as positive and parallel light be considered as incident on a lens then it is brought to a focus at the second focal point of the lens and the other focal point is called the first focal point. Throughout this specification the nomenclature referring to first and second focal points of either member of the objective is understood as referring to focal points defined when the direction of propagation of light is as if it were incident on the exterior surface of the positive member of the objective. When the spacing of the two members of the objective is such that the second focal point of the positive member coincides with the first focal point of the negative member the objective is afocal. It has a null convergence effect upon paraxial pencils of parallel light. When the objective is focused on an object nearer than infinity the two members are moved toward one another so that a certain two image points associated with the two members coincide, in the case of the positive member the image point formed by the member acting on a hypothetical pencil of light converging upon the axial point of the object, and in the case of the negative member the virtual image point formed by the member of the axial point of the object. When the members are spaced so that these two image points coincide the objective has a null convergence effect with respect to pencils of light originating in said axial object point.

Figure 1:
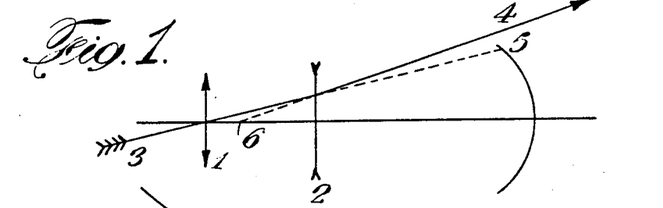
Figure 1 is a diagrammatic representation of an arrangement of lenses embodying the invention.

When the equations are applied to the negative member so as to evaluate the curvature of its tangential image surface the equations are applied as if parallel light were incident on the exterior surface of the negative member and the position of the image of its natural diaphragm, at the point 6 of Fig. 1, results from the structure of the objective as a whole and is located in the manner described below.

At 3 there is shown a pencil of parallel rays entering the exterior surface of the positive lens at its center at an appreciable angle of inclination to the axis, for the purposes of the following analysis, about seven degrees. At the negative lens 2 the pencil is deflected away from the axis to the position 4 to have an increased slope of approximately ten and one-half degrees. The ratio of the tangent of the first angle to the tangent of the second angle represents (except for distortion) the numerical value of the compression or its reciprocal the magnification constant of the objective.

The objective shown is corrected for astigmatism, spherical aberration, coma, chromatism and distortion, these terms having meanings in part slightly modified by the peculiarities of the refraction at cylindrical surfaces. For convenience of consideration the manner of correcting for each of the several factors will be discussed separately.

*Correction for astigmatism*

If the pencil 3 lying in a plane perpendicular to the generatrices of the cylindrical surfaces be homo-centric, the pencil 4 will in general not be homo-centric. There will be a certain amount of astigmatism along the pencil 4. The problem of correction, however, is different from that of correcting the same error in a system of spherical surfaces in that the sagittal imagery is unaffected by the objective. The generatrices of these surfaces all being parallel to the sagittal planes, the sagittal object and image along the pencil coincide per se. In order to correct the astigmatism therefore it is necessary to make the tangential image coincide with the object. This can be accomplished if the lenses 1 and 2 are so chosen as to material and form that the tangential image surface corresponding to the second focal point of the positive lens be given such a form that it will coincide with the tangential image surface corresponding to the first focal point of the negative lens. This will be clearer from the following analysis.

By a further development of the astigmatism equations of S. Czapski and then a simplification of them for a thin lens of two surfaces, it is possible to derive the following simple expression for the curvature of the image surface on which the tangential image of such a lens is formed, the object being assumed, for further simplification, to be at infinity, namely, $$\frac{1}{R_t} = -\frac{3n+1}{nF} + 6x\left[\frac{(n+1)}{nrF} - \frac{n}{(n-1)F^2}\right] - 3x^2\left[\frac{n+2}{r^2nF} - \frac{2n+1}{r(n-1)F^2} + \frac{n^2}{(n-1)^2F^3}\right]$$

Where $R_t$ is the radius of curvature of the tangential image surface, $F$, the focal length of the lens, $r$, the radius of curvature of the surface upon which the parallel light is incident, $n$, the index of refraction of the glass and $x$ the distance from the surface of radius $r$, to the point at which the incident pencil, or the prolongation of the pencil cuts the axis. All distances are considered as positive in the direction of propagation of the incident parallel light. The above equation will hereinafter be called the Newcomer-Czapski equation.

This equation is immediately applicable to the problem of the afocal cylindrical objective and we may apply it in the simplest manner by requiring each member of the objective to be formed as an achromatized cemented doublet in which the two glasses composing the member have the same index of refraction. This expression for the curvature of the tangential image surface of such a lens is a function of the index of refraction of the glass, the cambrure of the lens and the distance from the lens to the point on its axis at which the pencil cuts it. In the case of the cylindrical objective here described, the mounting of the positive lens acts as a natural diaphragm for the system and oblique pencils are centered upon the center of this positive member. In Fig. 1 the oblique pencil 3 is properly chosen as passing through the center of the lens 1. As a consequence the value of $x$ in the above equation is zero and the expression for the curvature of the tangential image surface of the positive lens of this objective is a rectangular hyperbola involving only the index of refraction. For indices in the range of practicability the hyperbola is nearly a straight line parallel to the axis of indices. Therefore the curvature of the tangential image surface 5 in Fig. 1 of the positive lens is independent of the cambrure of this lens and substantially independent of its index of refraction.

If, therefore, the negative lens 2 can be so chosen as to have the same tangential image surface, the objective as a whole will be free of astigmatism.

The pencil of parallel rays 4 in its prolongation cuts the axis of the lens 2 at the virtual point 6, the position of the point 6 being a function of the focal length of the lens 2 or of the magnification constant of the objective. The point 6 never being at the center of the lens 2 the expression for the curvature of its tangential surface is a function of the cambrure of the lens and of its index of refraction, varying appreciably with changes in either parameter. It is in fact a quadratic expression in the cambrure and a cubic expression in the index of refraction.

Within a certain range of magnifications and for constructions of the objective so far discussed, for any index of refraction there are two cambrures for which the two tangential focal surfaces of the positive and negative lens are identical. One of these is a negative lens with its exterior surface very convex exteriorly and having therefore a large spherical aberration as a consequence of which only a poor correction for spherical aberration and coma is obtainable. For the other the cambrure of the lens is more or less concave exteriorly and it is possible to obtain good corrections in other directions.

Figure 2:
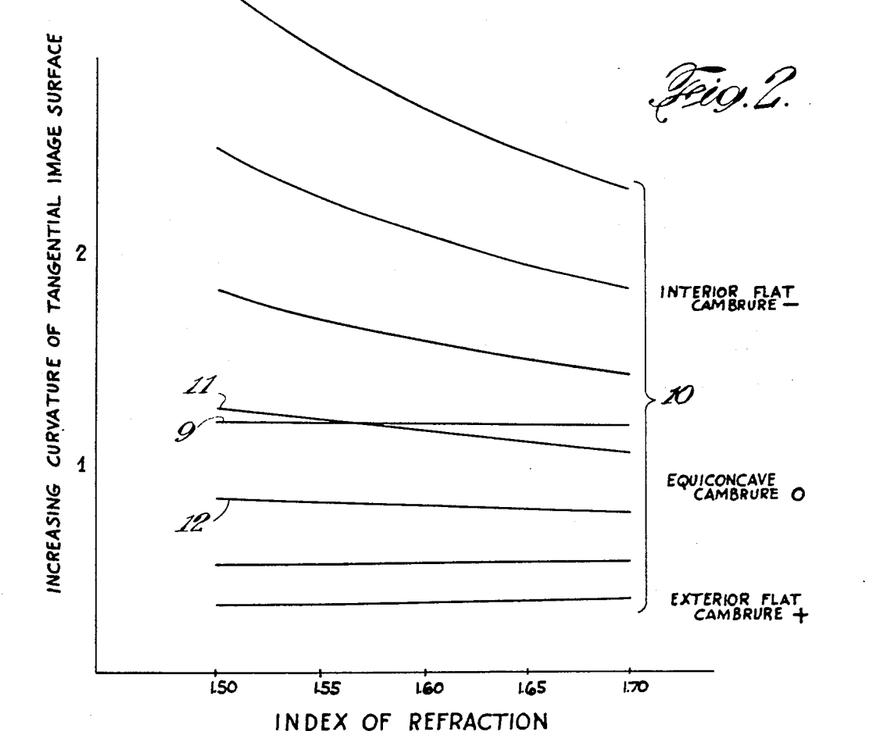
Fig. 2 is a plot indicating the effect on the astigmatism of changes in the cambrure and index of refraction of the negative member.

In Fig. 2 there is shown for an objective having a magnification constant of two-thirds a pair of coordinate axes, the abscissæ being increasing indices of refraction and the ordinates increasing values for the curvature of the tangential image surface of a single lens. At 9 is plotted the value of the curvature of the tangential image surface for the positive lens between the limits $n=1.5$ and $n=1.7$. At 10 is a family of curves representing the values of the curvature of the tangential image surface of the negative lens for values of $n$ between $n=1.5$ and $n=1.7$, each curve of the family corresponding to a particular cambrure of the lens, these values algebraically decreasing upwards. Intersections of the curve 9 with the family of curves 10 represent solutions of the anastigmatic condition. For magnifications less than two-thirds (greater compression) the family of curves is somewhat steeper. In any case it will be seen that algebraically increasing the cambrure or increasing the index of refraction of the negative lens decreases the curvature of its tangential focal surface. Decreasing the index of refraction or algebraically increasing the cambrure at least within the limits of this problem increases the spherical aberration of the lens.

The correction for the astigmatism of the objective thus far described is analytical. For simple lenses it approximates very closely a trigonometric solution and the latter is easily obtained by interpolation. With increasing differences in the refractive indices of the two elements composing the achromatized negative member the separating cemented surfaces or uncemented surfaces will or may introduce an increasing astigmatic effect upon the traversing pencil, an effect whose results must be considered in interpreting the simple formula. A positive astigmatic effect at this intermediate surface implies a flattening of the tangential image surface of the negative lens (and vice versa) which must be compensated for. In the example of a two-thirds magnification objective here given this astigmatic effect of the cemented surface amounts to less than one hundredth of a diopter and is therefore negligible in laying out the objective. The form of the negative member, as chosen analytically is nearly correct and the first or second interpolation gives true correction.

If we separate the two component lenses of a member by an air space or if even without such separation in the case of the negative member we depart appreciably from equality of indices for the two component lenses of the member then the simple analytical formula given above is not sufficient to determine the curvature of the tangential image surface. The second lens of such a member then adds an increment of curvature positive or negative to the curvature of the tangential image surface of the member as a whole which is different from the increment in the case for the cemented doublet of equal indices. The curvature of the tangential image surface of such a member is determined by a double application of the formula. The value of the curvature of the surface for the first lens of the member is determined as above, the solution giving the distance of the tangential image point. As a first approximation this distance may be taken as equal to the focal length of the first lens. This distance $a$ then enters into the following formula—

$$\frac{1}{R_t} = -\frac{3n+1}{nF} + \frac{6}{\left(\frac{1}{x}-\frac{1}{a}\right)}\left[\frac{n+1}{nrF} - \frac{n}{(n-1)F^2} - \frac{2n+1}{anF}\right] - 110$$

$$\frac{3}{\left(\frac{1}{x}-\frac{1}{a}\right)^2}\left[\frac{n+2}{r^2 nF} - \frac{2n+1}{r(n-1)F^2} - \right.$$

$$\left. \frac{4n+4}{arnF} + \frac{n^2}{(n-1)^2 F^3} + \frac{3n+1}{a(n-1)F^2} + \frac{3n+2}{a^2 nF}\right]$$

The evaluation of this formula gives the desired curvature of the tangential image surface of the member as a whole. If the member were composed of three lenses the formula would be applied again to the third lens, etc.

In this discussion I have considered the objective as composed of two members, a positive one and a negative one. It is an essential characteristic of the objective that this condition should be fulfilled if an afocal compression objective is to result. Let us examine what latitude this gives us for the construction of the individual members. Consider the fundamental equation of Gullstrand for the combination of two refracting systems.

$$D_{1,2} = D_1 + D_2 - \delta D_1 D_2$$

$$H_{1,2} = \frac{\delta D_2}{D_{1,2}} \quad H'_{1,2} = -\frac{\delta D_1}{D_{1,2}}$$ where $D_{1,2}$ is the refractive power of the combined system, and $D_1$ and $D_2$ the refractive powers of the first and second system respectively, $\delta$ the distance from the second principal point of the first system to the first principal point of the second system divided by the index of refraction of the intervening medium, and $H_{1,2}$ and $H'_{1,2}$ are the distances of the first and second principal points of the partial systems respectively. Considering the application of this equation to the construction of a combined system substituting either member of the afocal objective, it is obvious that if the combined system is to be negative, both partial elements cannot be positive as the last term is otherwise less in absolute value than the sum of the other two. For a negative combined system in which the partial elements are both negative, the last term is positive and the combined refractive power cannot be given a greater value by separating them. The reverse is the case for a positive combined system. If a positive combined system is composed of a positive and a negative partial element, as it must be if it is to be achromatic, then increasing the distance between the two elements increases the refractive power of the combined system, and we may keep the combined system of the same refractive power while increasing the refractive power of the negative element. If in our afocal objective we displace the positive element of the positive member toward the inside of the objective and move it away from its component negative element, then the above formulæ show that the second principal point of the combined positive member lies at a substantial distance away from the positive element and in the direction of the negative member of the afocal objective. The first principal point of the combined positive member is displaced a substantial amount in the same direction. By an appropriate choice of refractive powers of the three lenses and constringencies of the glasses composing them the afocal combination of three simple lenses can be made achromatic. It is necessary to determine the position of the natural diaphragm in order to apply the usual equations. In Fig. 1 the ray 4, if followed backward along its path, passes through the center of the lens 1. For a lens of finite thickness it would be more appropriate to say that the ray 3, if constructed to be parallel to itself on each side of the lens 1 must enter and leave the lens so as to be directed through and from respectively the first and second principal points of the lens 1. These same conditions hold for the positive combination of the three lens objective.

Figure 10:
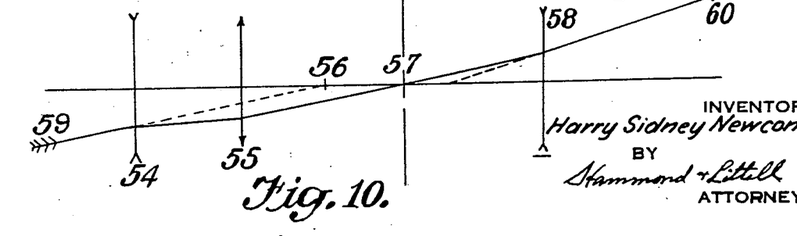
Fig. 10 is a diagrammatic representation showing an arrangement of lenses embodying the invention in which three members are used.

In Fig. 10 I have shown schematically the construction of such an afocal objective with a magnification constant two-thirds. At 54 I have indicated a negative lens, at 55 a positive lens separated from the lens 54 by a substantial interval. At 56 and 57 I have indicated respectively the first and second principal points of the combined system 54, 55 and at 58 I show the negative member of the afocal objective. At 57 I have also indicated the diaphragm of the system. A ray parallel to the axis entering the lens 54 at any given height leaves the lens 58 parallel to the axis and at two-thirds of the same height. At 59 I have indicated an oblique ray entering the lens 54 and directed toward the point 56 with an arbitrary slope of ten degrees. At 54 it is deflected away from the axis and at 55 it is deflected to pass through the point 57 and parallel to the original direction of incidence at 59. At the lens 58 it is again deflected away from the axis to leave the lens as the ray 60 having a slope of approximately fifteen degrees with the axis. The second principal plane of the combined positive member occupies the position of the natural diaphragm of the objective as a whole and a physical diaphragm should be placed in this position.

To illustrate this discussion, I give below the data for one of the infinity of such achromatic afocal compression objectives having a magnification constant of two-thirds. The three refractive powers and constringence ratios of its three lenses and its construction points are as follows:

| Lens I | Lens II | Lens III |
| --- | --- | --- |
| $D_1 = -10$ diopters<br>$\nu_1 = \nu_1$ | $D_2 = +12$ diopters<br>$\nu_2 = \frac{325}{174}\nu_1$ | $D_3 = -10$ diopters<br>$\nu_3 = \frac{13}{7}\nu_1$ |

For the group I, II
$D_{1,2} = 6\frac{2}{3}$ diopters
$H_{1,2} = 70$ millimeters
$H'_{1,2} = 58\frac{1}{3}$ millimeters It is to be understood that this data is for a single objective as described above and schematically indicated in Fig. 10. As such it completely defines all of the dimensions and spacings there indicated.

Such an objective is corrected as is the two lens objective by a choice of a pair of equal curvatures of the tangential image surfaces corresponding to balanced spherical aberrations. The curvatures of the tangential image surfaces of the various possible forms of the negative lens are determined as described above. In the case of the combined positive member we determine a family of curves similar to the curves 10 of Fig. 2 giving the curvatures of the tangential image surfaces corresponding to possible forms and indices of the second or positive lens of the positive member, the X of the formula being fixed in value by the geometrical construction of Fig. 10 and an approximate value of the quantity $a$ of the formula being derived from the value for the focal length of the first or negative lens of the member. It is then a simple problem to consider the variations in these curves due to the possible variations in the parameter $a$ obtainable by changes in the character of the lens 54. From this final double family of curves representing possible curvatures of the tangential image surface of the positive member we may choose a value for the curvature equal to one of the possible curvatures of the tangential image surface of the third lens or negative member. The number of possible solutions is limited by the limitation placed upon the indices of the glasses by the constringencies which are required for them. Considerations relative to the balancing of the spherical aberrations of the lenses further limit the possible solutions. The analytical solution is finally corrected by trigonometric calculations.

The above objective which results from the separation of the positive member into two components has been referred to as a three lens or three member objective. In the following discussion and description of the properties which I have discovered as giving a corrected anamorphosing afocal cylindrical objective, reference is had more particularly to the two member objective first described, without, however, thereby necessarily limiting the discussion to such objectives.

Correction for spherical aberration

In constructing the astigmatically corrected objective it will have been necessary to consider at the same time a correction for spherical aberration. That is to say, the longitudinal spherical aberration of the positive member at a specified opening must nearly exactly balance the longitudinal spherical aberration of the negative member at an equal relative opening or at a smaller absolute opening proportionate to the compression constant of the objective. It is thus not necessary that either should be small in absolute value but it is obvious that they should not be unnecessarily large if they are to properly neutralize each other. If the indices of each member are uniform the possible forms and indices of the negative member will fix its spherical aberration at some nominal but not small figure. If, however, in a member the indices differ somewhat in value then the spherical aberration of the member may be appreciably smaller than this figure or even nearly zero. Such a circumstance presents a desirable selection in that it permits a better correction of the zonal and chromatic spherical aberrations of the objective as a whole. In the illustrative example the specific glasses selected permit of such a correction, its degree depending upon the lengths of the intermediate radii which are adopted. In this objective both members are constructed from a heavy crown of somewhat less index of refraction than the flint. The separating surface has a refractive power opposite in sign to that of the member in which it lies. In the case of the negative member this results, because of the form which it has been given by the anastigmatic condition, in a longitudinal spherical aberration which is considerably nearer zero than the spherical aberration of a similarly formed simple lens. If the ratio of the constringencies or reciprocal dispersions, usually indicated by the Greek letter Nu $\nu$, of the two glasses is increased by using heavier flints the exterior surfaces become more curved. Decreasing the index of the crown results in such a strong cemented surface that the exterior surfaces are again more curved and the spherical aberration becomes unnecessarily large and negative. Increasing the index of refraction, $n$, of the crown makes the spherical aberration too strong. Turning the cemented surface in the opposite direction increases the spherical aberration and increases the astigmatism of the cemented surface. This astigmatism is nearly zero in the example.

In the case of the positive member there are many combinations of glasses which will give a low spherical aberration to correspond to that of the negative member but in order to easily treat the coma problem, it is necessary that the front and back surfaces of this member be not widely unequal. If the indices be markedly different this necessitates the strong cemented surface being concave toward the negative member and the coma correction cannot be made. If the crown be not too greatly less in index of refraction than the flint suitable cambrures to meet both conditions may be made. Barium crowns are just as suitable as heavy crowns. I prefer to use a barium crown or a heavy crown glass having a greater index of refraction than 1.55 and a flint glass whose index of refraction is from 0 to 2½% greater than that of the crown glass. Preferably the strength of the cemented surface is less than 10% of the total strength of the member, and this applies to both the positive and negative members.

*Correction for chromatic aberration*

It has been mentioned that the objective may be composed of two separately anchromatized members.

In correcting a lens for color it is customary to bring together at the same focal point rays at the two margins of the useful spectrum or in other words to center the correction upon the useful spectrum.

If in the present problem such practice is followed and the two members are corrected separately for the central portion of the useful spectrum two aberrations result, one of which is a variable color magnification for oblique rays or in other words different exit angles for the central oblique rays of different colors; the other is an increase of like nature in the coma aberration. However, if the members are separately achromatized so as to center the achromatization on the extreme short wave length margin of the useful spectrum or somewhere near this margin then the central oblique ray will have the most nearly equal exit angles for different colors in that useful spectrum and it will be possible by other changes in the design of the two members which do not affect this achromatization to not only produce approximately zero astigmatism along the central oblique ray but to make oblique rays at increasing and decreasing heights of incidence from that central ray emerge from the objective with exit angles which are the most nearly equal for varying colors and varying heights.

Figure 4:
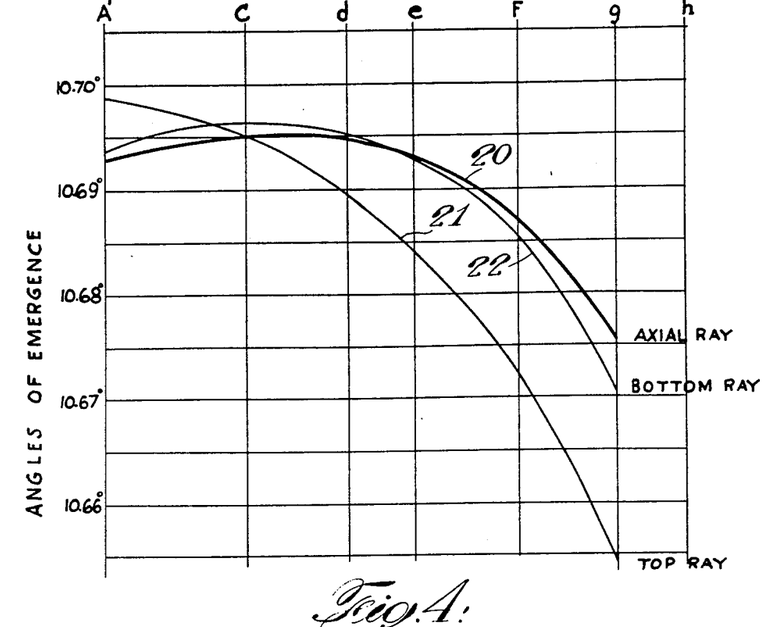
Fig. 4 is a plot indicating the chromatic deviation of light entering the objective at an angle of 7° with the axis with correction centered on the e ray.
Figure 5:
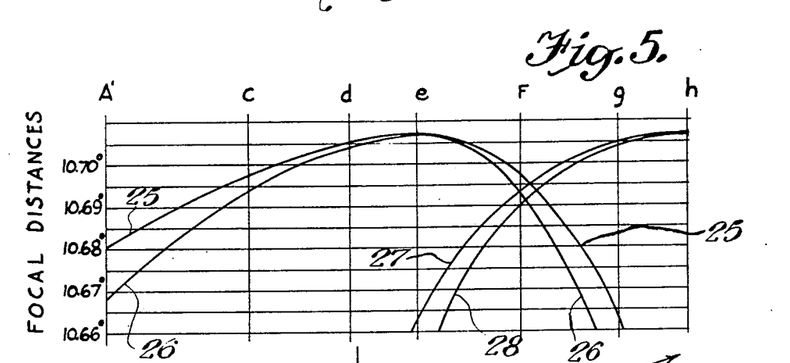
Fig. 5 is a plot indicating comparatively the longitudinal focal differences for light of different colors of the positive and negative members when centering the color correction on the e and h rays.
Figure 6:
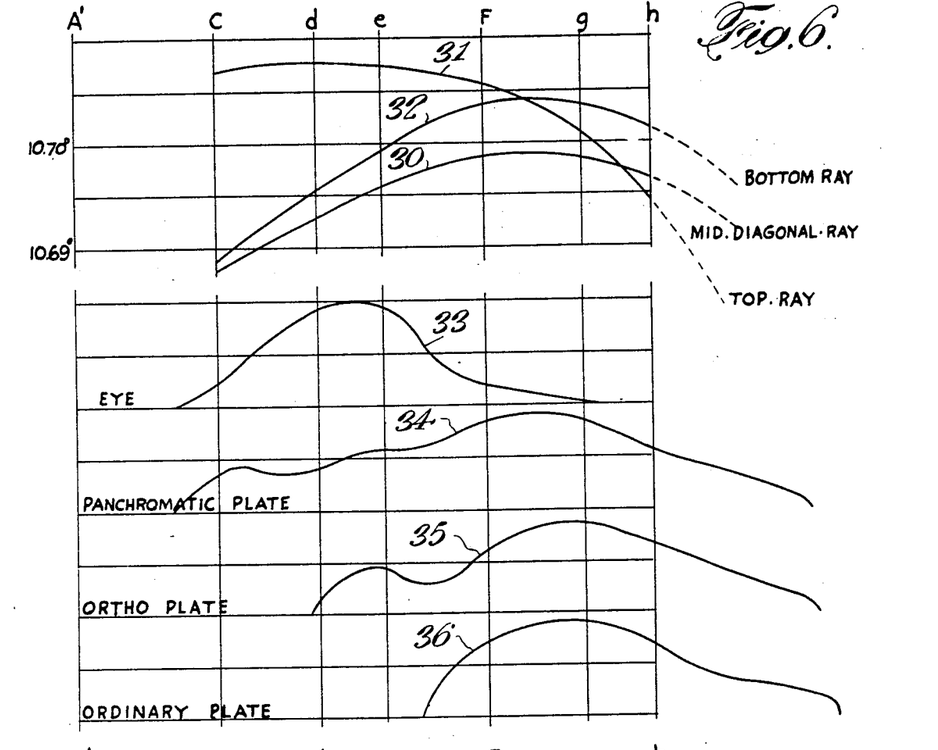
Fig. 6 is a plot indicating the deviation of light entering the objective at an angle of 7° with the axis when the chromatic correction of the individual members has been centered on the h ray. Below these curves are given certain sensitivity curves for purposes of comparison.

This will be better understood if we consider an analysis of the conditions by reference to the diagrams of Figs. 4, 5 and 6.

In the plot of Fig. 4 there is represented the angle of emergence of light emanating from a point on the object situated about seven degrees from the axis and passing through the upper and lower edges and the center of the positive member of the objective at an opening of 10 mm. The objective for which the plot is drawn has been achromatized in the ordinary manner as if the objective were to be corrected and used for the visible spectrum and therefore each member is separately achromatized so as to center the correction on the visible spectrum, that is to center the correction about on the $e$ line. In this plot the abscissæ represent wave lengths and are designated by the conventional letters for particular wave lengths, the longer wave lengths being at the left. The ordinates represent emergence angles for light rays. The objective and the entire system being focused on infinity perfect definition of the line off the axis will result if the rays at various heights of incidence all emerge with the same exit angle. The permissible or desirable limit for the difference in the angle of emergence in this instance may be taken as two hundredths of a degree corresponding to two hundredths of a millimeter on the film. Now for the incident light considered the curve 20 represents for light of different wave lengths the angles of emergence of rays incident on the center of the positive member. The curve 21 represents the angle of emergence of light from the same point of the object but incident upon the positive member adjacent to the upper edge thereof and the curve 22 represents the angle of emergence of light from the same point of the object but incident upon the positive member adjacent to the lower edge thereof. It will be noted that for light of wave lengths between the C and $e$ lines the angles of emergence are not greatly different but that for shorter wave lengths the angles of emergence decrease materially. The correction is much better to the left of $e$, the center of correction, than it is to the right thereof. It will be shown that changes in the structure of the objective may improve this slightly but a substantial improvement may only be obtained by a different criterion for achromatization of the individual members.

In Fig. 5 are plotted two sets of curves. The abscissæ as before are wave lengths but the ordinates are longitudinal chromatic differences in focal length. The pair of curves 25, 26 toward the left represents the chromatic differences for the two members of the objective of the plot of Fig. 4 and the pair of curves 27, 28 represents the chromatic differences for a similar pair of members but achromatized so as to center the chromatic correction on the line $h$ or thereabouts, in other words at the extreme short wave length margin of the useful spectrum, C to $h$, for which we are in this instance under discussion correcting the objective. The curves 25 and 27 represent the aberrations of the negative members and the curves 26 and 28 the aberrations of the positive members. It will be noted that the aberrations of the two members neutralize each other to a considerable extent in either objective but that in the individual member when considered by itself the longitudinal chromatic aberrations are only acceptable if the correction is centered substantially on the region of the spectrum to be used.

In Fig. 6 are plotted the resultant curves for an objective composed of the pair of members, the aberrations of which are represented by the curves 27, 28. It will be seen that the exit angles for the different rays lie very closely together from the $h$ line to the $e$ line and even clear across the spectrum to the C line. In any case the optimum resultant correction is distinctly toward the long wave length side of where the achromatization of the individual members has occurred. Not only is the total angular difference across the opening of the objective and spectrum less but the angular difference for central rays of different colors is now nearly the same over a wide region of the spectrum. It is one of the advantages of this objective that it is possible to stop down the lens and improve the definition. The correction is particularly good in the region from F to $h$ where the ordinary photographic emulsion is most sensitive. Considerations of opening and maximum angle and their effect upon the curves will determine just how far to the left a correction may remain sufficient.

In the plot of Fig. 6 increasing the heights of incidence raises the marginal ray curves and rotates them away from the axial ray curve and conversely. Increasing the angle of incidence has substantially the same effect but with less rotation. The result of either is to make the region of least angular difference remain nevertheless to the left of the so-called achromatization center. The effect, as zero angle is approached, is complicated by the spherical aberration condition that may obtain. The objective represented by the plot of Fig. 4 is substantially free of spherical aberration and chromatic differences of focus for small pencils over the whole spectrum from C nearly to F. The objective represented by the plot of Fig. 6 is substantially free of spherical aberration from $d$ to $g$ and the region can be shifted to the left by separation of the members. Both objectives have everywhere a small spherical aberration.

A consideration of the various factors entering into the problem will permit one to choose the actual optimum correction to suit the conditions under which the objective is to be used.

The plot of Fig. 6 includes in addition to the curves 30, 31 and 32 representing the emergence angles of axial, top and bottom rays of different colors at an opening of 10 mm., curves 33, 34, 35 and 36 which indicate respectively the sensitiveness to the same colors of the human eye, the panchromatic plate, the ortho-chromatic plate and the ordinary plate. These curves are shown to facilitate analysis of the results of the corrections indicated.

*Correction for coma*

In the plot of Fig. 4 and particularly in plot of Fig. 6 I presented the characteristics of an objective in which oblique rays of high incidence above and below the center exited nearly parallel to the central ray. Aside from the fact that a certain type of achromatization was necessary in order to obtain this result no mention was made as to the method of doing so.

Figure 7:
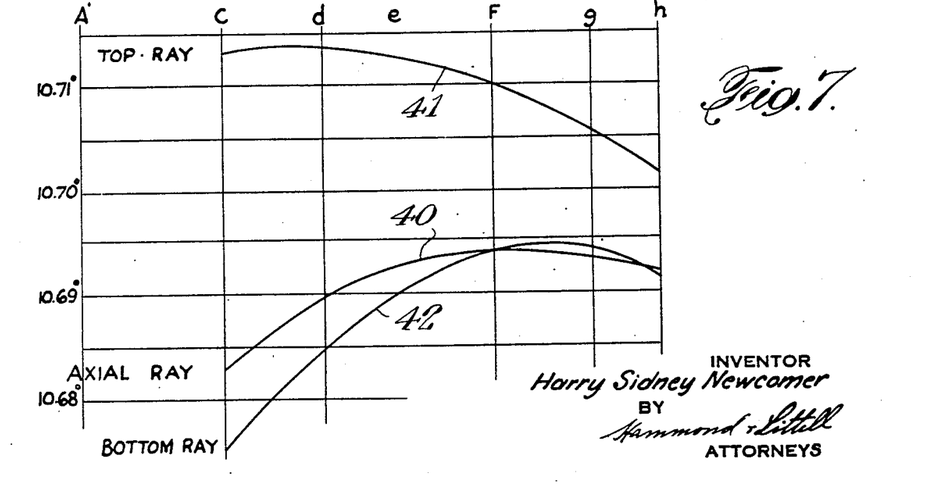
Fig. 7 is a plot indicating the chromatic deviation of light entering an objective at an angle of 7° with the axis with the correction centered on the h ray.
Figure 8:
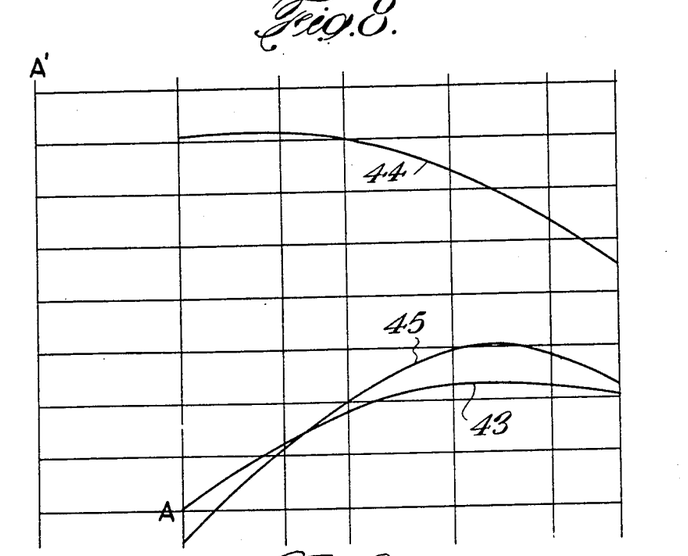
Figs. 8 and 9 are similar to Fig. 7 but indicating the effect of decreasing and increasing respectively the cambrure of the positive lens.
Figure 9:
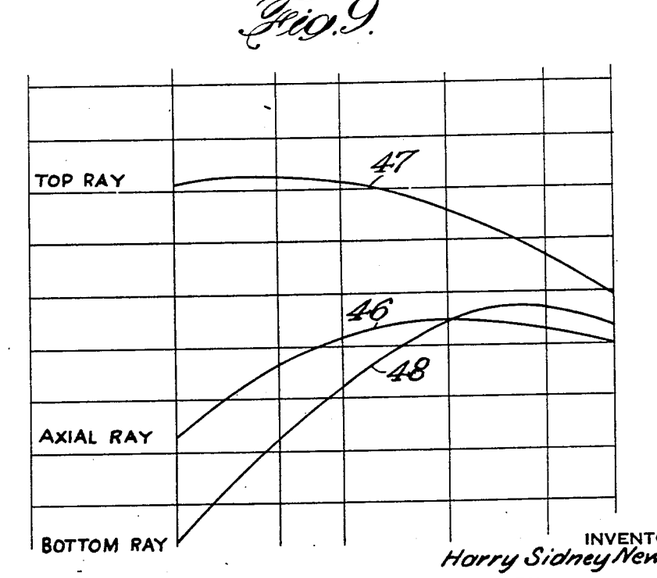

If we consider the plot of Fig. 4 it will be evident that a change of achromatization of the individual members from the region centering on $e$ to that centering on $h$ will result in some such picture for the plot as is represented in the plot of Fig. 7 in which the curves 40, 41 and 42 correspond to the curves 20, 21 and 22 of Fig. 4. The curve for emergence angle of the central ray is nearly horizontal for a considerable distance to the left of $h$. The upper and lower ray emergence angles are plotted as curves roughly sloping in opposite directions and their mean is horizontal. It is now necessary to modify the objective so as to bring the three curves more nearly together. Changing the cambrure of the positive member has in this situation as its principal result the raising (or lowering) of both the high incidence curves with respect to the central ray curve. When they are raised they are also separated to an increased extent and when they are lowered and slightly approximated they are at the same time disadvantageously tipped with respect to each other. See plots of Figs. 8 and 9 in which the effect of change of cambrure in opposite directions is indicated by the curves 43, 44 and 45 of Fig. 8 and curves 46, 47 and 48 of Fig. 9 representing the axial, top and bottom rays respectively in each case.

However changing the cambrure of the negative member moves them in the opposite direction and hence towards each other. A suitable bending of the negative member will produce the condition represented in the plot of Fig. 6 in which approximately optimum conditions have been reached for these materials for a specified region to the left of $h$. From the above explanation of the effect of changing the cambrure of the positive member it will be evident that a further bending of that member will not improve this objective to any appreciable extent except at the expense of making the situation worse in the $g$—$h$ region.

Of course it is obvious that this bending of the negative member is closely connected with the astigmatism conditions discussed above and that the latter is a limiting condition in the sense of the infinitesimal calculus as the incidence heights approach zero. It is also obvious from general mathematical considerations that an optimum situation as represented by the plot of Fig. 6 will not necessarily exactly equal a perfect anastigmatic correction although they are always nearly the same and approach equality with decrease in the opening of the objective.

The curves of the various plots have all been drawn for the same angle and heights of incidence. The curves are changed somewhat by changing these factors but the general considerations are the same and the objective must be designed to have optimum corrections for the conditions under which it is to be used.

The result of increasing the angle of incidence is in general to increase proportionately the distance of the high incidence curves from the central ray curve and the result of increasing the heights of incidence is to tip the high incidence curves in opposite directions about a point somewhere near their intersection point, increasing their slope differences.

The foregoing considerations place certain limits, even when varying the glass, upon the geometrical form to be given the positive member. Its cambrure must be greater than zero. In fact it must lie between zero and one-half the strength of the member.

The distortion of this objective decreases with the increase in cambrure of the negative member. It is of the nature of a slightly decreased magnification constant at the borders in the active direction. It is sufficiently small to be ignored being about ¾ of one per cent at 7° in the illustrative example. There is no barrel distortion.

There is a certain amount of astigmatism along oblique pencils in planes parallel to the generatrices of the cylinders. This astigmatism however is sufficiently small so as to produce no noticeable effect upon the quality of the image. Its amount is, in fact, for objectives of the type discussed practically independent of the particular construction of the objective increasing, however, with a decreasing magnification constant (increased compression).

Figure 3:
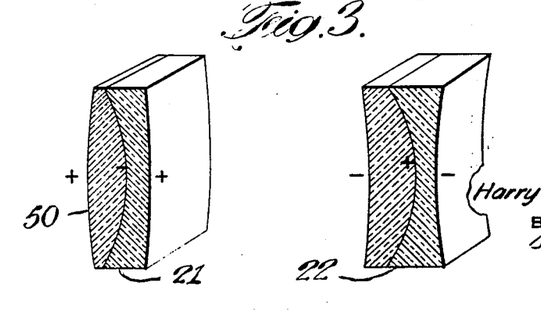
Fig. 3 is a sectional view of an objective embodying the invention.

In Fig. 3 are illustrated lenses for an objective embodying the principles of the invention. The positive member of the objective is shown as consisting of a double convex element 50 of barium or heavy crown glass and cemented thereto a concavo-convex element of light flint glass. The negative member is shown as consisting of a concavo-convex element of light flint and cemented thereto a double concave element of barium or heavy crown glass. The characteristics of the objective are as follows:

$r_1 = +80.9$ mm.
  $d_1 = 4.5$ mm.  Crown  $\alpha_1 = 707$
$r_2 = -30.2$ mm.
  $d_2 = 2.6$ mm.  Flint  $\alpha_2 = 766$
$r_3 = -152.8$ mm.
    Interval 27.21 mm.
$r_4 = -80.9$ mm.
  $d_3 = 5.5$ mm.  Flint  $\alpha_2 = 766$
$r_5 = -19.1$ mm.
  $d_4 = 2.4$ mm.  Crown  $\alpha_1 = 707$
$r_6 = +65.4$ mm.
    Opening 20 mm.

In which $\alpha$ is the coefficient of expansion of the glass, $r$ is the radius of curvature in millimeters and $d$ is the thickness in millimeters.

The glasses are the same in each member and have indices as follows:

|  | $A'$ | $C$ | $d$ | $e$ | $F$ | $g$ | $h$ |
| --- | --- | --- | --- | --- | --- | --- | --- |
| Crown | 1.5546 | 1.5578 | 1.5603 | 1.56279 | 1.56696 | 1.5719 | 1.5779 |
| Flint | 1.56207 | 1.56961 | 1.5737 | 1.57697 | 1.5834 | 1.59131 | 1.5181 |

The foregoing particular description is illustrative merely and is not intended as defining the limits of the invention.

I claim:

1. An afocal anamorphosing cylindrical objective consisting of two members, the one positive and the other negative, the axial planes of all the cylindrical elements of the objective lying in one and the same plane, the second focal point of the positive member coinciding with the first focal point of the negative member, the tangential focal surface of the positive member corresponding to its second focal point being curved from a true plane and the tangential focal surface of the negative member corresponding to its first focal point being curved to the same extent from a true plane thus correcting for astigmatism of oblique rays.

2. An afocal anamorphosing objective consisting of two members, the one positive and the other negative, each member composed of at least two cylindrical elements, the axial planes of all of the cylindrical elements of the objective lying in one and the same plane, the members so spaced that the second focal point of the positive member coincides with the first focal point of the negative member, the tangential image surface of the positive member corresponding to its second focal point being curved from a true plane and the tangential image surface of the negative member corresponding to its first focal point being curved to the same extent from a true plane thus correcting for astigmatism of oblique rays, the natural diaphragm of the afocal objective being approximately at the exterior surface of the positive member.

3. An afocal anamorphosing objective consisting of two members, the one positive and the other negative, each member composed of at least two cemented cylindrical elements, the axial planes of all of the cylindrical elements of the objective lying in one and the same plane, the members being spaced a distance substantially equal to the numerical difference between their respective absolute focal lengths, whereby the second focal point of the positive member coincides with the first focal point of the negative member, the radius of curvature of the exterior surface of the negative member being approximately that given for it by the Newcomer-Czapski equation when the radius of curvature of the tangential focal surface of the negative member corresponding to its first focal point is taken as substantially equal to the radius determined by the Newcomer-Czapski equation for the tangential focal surface of the positive member corresponding to its second focal point, both focal surface curvatures being those given by the equation for principal rays cutting the axis of the objective as a whole at the exterior surface of the positive member, substantially as described.

4. An astigmatically and spherically corrected anamorphosing objective consisting of two members, the one positive and the other negative, so spaced that the second focal point of the positive member coincides with the first focal point of the negative member thereby to provide a null convergence relation, each member composed of at least two cemented cylindrical elements, the axial planes of all of the cylindrical elements of the objective lying in one and the same plane, the natural diaphragm of the objective being approximately at the exterior surface of the positive member, the cambrure of the negative member being zero or negative so that the tangential image surface of the negative member corresponding to its first focal point has substantially the same curvature as the tangential image surface of the positive member corresponding to its second focal point, thus correcting for astigmatism of oblique rays.

5. An afocal anamorphosing objective consisting of two members, the one positive and the other negative, each member composed of two cemented cylindrical elements, the axial planes of all the cylindrical elements of the objective lying in one and the same plane, the members being spaced a distance substantially equal to the numerical difference between the respective focal lengths, whereby the second focal point of the positive member coincides with the first focal point of the negative member, the objective having in addition to coincidence of these two focal points relating to axial pencils of parallel rays, also coincidence of a continuum of pairs of focal points of the two members corresponding to the aforementioned focal points and relating to oblique pencils of rays constituting parallel bundles exterior to the objective and passing through the axial points on the exterior surface of the positive member, thus correcting for astigmatism of oblique rays.

6. An afocal anamorphosing cylindrical objective consisting of a system of cylindrical lenses, the axial planes of all the cylindrical elements of the objective lying in one and the same plane, the elements comprising two groups, or members, the one convergent, the other divergent, the convergent group consisting of two spaced cylindrical elements, one of which is divergent and the other convergent, the second focal point of the positive group, or member, coinciding with the first focal point of the negative member, the tangential focal surface of the positive member corresponding to its second focal point being curved from a true plane and the tangential focal surface of the negative member corresponding to its first focal point being curved to the same extent from a true plane thus correcting for astigmatism of oblique rays.

7. An objective of the character defined in claim 1 wherein one of the members comprises a plurality of component lenses separated by an air space.

8. An objective of the character defined in claim 2, wherein one of the members comprises a plurality of component lenses separated by an air space.

9. An optical apparatus for taking or projecting cinematographic or photographic views comprising in combination an anamorphoser and a spherical objective, the anamorphoser being composed of a convergent and a divergent cylindrical lens or member with parallel generating lines and coincident axial planes, the convergent and divergent lenses being spaced a distance apart substantially equal to the difference between their absolute focal lengths, whereby the second focal point of the convergent lens coincides with the first focal point of the divergent lens, thus locating the image due to the anamorphoser in the same plane as the object, and thus correcting for astigmatism along the axis of the anamorphoser, the cylindrical lens of the anamorphoser situated furthest from the spherical objective being divergent and having a concave exterior surface, thus correcting for astigmatism of oblique rays.

10. An optical apparatus as in claim 9 in which in the anamorphoser each member is corrected for achromatism and each composed of two cylindrical elements cemented together, in which in each member the index of refraction of the flint glass is greater than that of the crown glass.

11. An optical apparatus as in claim 9 in which in the anamorphoser each member is corrected for achromatism and each composed of at least two cylindrical elements cemented together, the positive element achromatizing the divergent member having a greater index of refraction than any other element of the member.

12. An optical apparatus as in claim 9 in which in the anamorphoser the exterior surface of the divergent member has a radius of curvature shorter but not less than one half as long as that of the free surface of the member interior to the anamorphoser, the interior free surface being concave.

13. An anamorphosing afocal objective composed of two members, the one positive and the other negative, each separately corrected for achromatism, each composed of at least two cylindrical elements, the axial planes of all the elements of the objective lying in one and the same plane, the numerical value of the cambrure of the positive member being between zero and ½ the refractive power of the member.

14. An anamorphosing afocal objective composed of two members, the one positive and the other negative, each separately corrected for achromatism, each composed of at least two cylindrical elements, the axial planes of all the elements of the objective lying in one and the same plane, the free surface of the positive member exterior to the objective being positive and having a radius of curvature less than but not less than one third as long as that of the interior free surface of the member, the interior free surface being positive.

15. An anamorphosing afocal objective composed of two members, the one positive and the other negative, each separately corrected for achromatism, each composed of at least two cylindrical elements, the axial planes of all the elements of the objective lying in one and the same plane, in which the free surface of the negative member exterior to the objective is negative and has a radius of curvature shorter but not less than one half as long as that of the interior free surface of the member, the interior free surface being negative.

16. An astigmatically and spherically corrected anamorphosing objective consisting of two members, the one positive and the other negative, so spaced that the second focal point of the positive member coincides with the first focal point of the negative member thereby to provide a null convergence relation, each member consisting of at least two cemented cylindrical elements, the axial planes of all the cylindrical elements of the objective lying in one and the same plane, the cambrure of the negative member being negative and less in absolute value than two fifths the absolute value of the strength in diopters of the negative member.

17. An anamorphosing afocal objective according to claim 14 in which the free surface of the negative member exterior to the objective is negative and has a radius of curvature shorter but not less than one half as long as that of the interior free surface of the member, the interior free surface being negative.

18. An astigmatically and spherically corrected anamorphosing objective consisting of two members, the one positive and the other negative, so spaced that the second focal point of the positive member coincides with the first focal point of the negative member thereby to provide a null convergence relation, each member composed of two cemented cylindrical elements, the axial planes of all of the cylindrical elements of the objective lying in one and the same plane, the natural diaphragm of the objective being approximately at the exterior surface of the positive member, the convex sides of both cemented surfaces facing forward in the direction of the exterior surface of the negative member, the free surfaces of each member having the same sign as the member, the surfaces of each member exterior to the objective having in each case a shorter radius than the radius of the interior free surface of the same member.

19. An afocal anamorphosing objective consisting of two members, the one positive and the other negative, each member composed of two cemented cylindrical elements, the axial planes of all the cylindrical elements of the objective lying in one and the same plane, the members being spaced a distance substantially equal to the numerical difference between the respective focal lengths, whereby the second focal point of the positive member coincides with the first focal point of the negative member, the radius of curvature of the exterior free surface of the negative member being shorter than the radius of curvature of the interior free surface of the member, and wherein the cemented surface of the negative member is concave toward the positive member.

20. An afocal anamorphosing objective as in claim 19, corrected for spherical aberration, in which the longitudinal spherical aberration of each member separately is substantially less than the longitudinal spherical aberration of a simple lens having the same average index of refraction and the same form.

21. An anamorphosing afocal objective consisting of two cylindrical members, the one positive and the other negative, each composed of at least two cemented cylindrical elements, the axial planes of all the cylindrical elements of the objective lying in one and the same plane, in each member the glass of the element situated exteriorly with respect to the objective having a larger constringence or Abbe number and a not larger index of refraction for yellow sodium light than the glass of the element adjacent thereto, in which the radius of curvature of the exterior free surface of the negative member is not longer than that of the interior free surface of the member, both said surfaces being concave.

22. An anamorphosing afocal objective comprising a positive and negative member separated by an air space, the positive member consisting of a convergent cylindrical element cemented to a divergent cylindrical element having a smaller constringence or Abbe number, the negative member consisting of a convergent cylindrical element cemented to a divergent cylindrical element of greater constringence or Abbe number, the axial planes of all the elements lying in one and the same plane, in each member the element of smaller constringence or Abbe number being adjacent to the air space and having an index of refraction for yellow sodium light at least as great as that of the other element of the member, the convexity of the cemented surface of each member facing in the direction of the exterior free surface of the negative member, in which in each member the radius of curvature of the interior free surface adjacent to the air space is at least as long as that of the exterior free surface of the same member.

23. An anamorphosing afocal objective comprising a positive and negative member separated by an air space, the positive member consisting of a double convex heavy crown glass cylindrical element and a concavo-convex light flint glass cylindrical element cemented thereto, the negative member consisting of a concavo-convex light flint glass cylindrical element and a double concave heavy crown glass cylindrical element cemented thereto, the axial planes of all the elements lying in one and the same plane, the flint glass elements being adjacent to the air space, the convexity of the cemented surfaces facing in the direction of the surface of the negative member exterior to the objective, the radius of the free surface of flint glass element of each member being greater than that of the free surface of the crown glass element of the same member, in which the index of refraction for yellow sodium light of the flint glass of each member is at least as great as that of the crown glass of the same member.

24. An anamorphosing afocal objective comprising a positive and negative member separated by an air space, the positive member consisting of a double convex heavy crown glass cylindrical element and a concavo-convex light flint glass cylindrical element cemented thereto, the negative member consisting of a concavo-convex light flint glass cylindrical element and a double concave heavy crown glass cylindrical element cemented thereto, the axial planes of all the elements lying in one and the same plane, the flint glass elements being adjacent to the air space, the convexity of the cemented surfaces facing in the direction of the surface of the negative member exterior to the objective, the radius of the free surface of the flint glass element of each member being greater than that of the free surface of the crown glass element of the same member, in which the index of refraction for yellow sodium light of the flint glass of the member is greater than that of the crown glass of the same member, and in which the longitudinal spherical aberration of each member separately is substantially less than the longitudinal spherical aberration of a simple lens having the same average index of refraction and the same form.

25. A compound objective comprising positive and negative members corrected for achromatism, the correction being centered at the short wave length end of that portion of the spectrum for which the objective is designed to be used, the corrections of the two lenses neutralizing each other, whereby the correction of the objective as a whole is better than the correction for either lens alone.

26. An anamorphosing afocal objective comprising positive and negative cylindrical members, one member being corrected for achromatism, the correction being centered at the short wave length end of that portion of the spectrum for which the objective is designed to be used.

27. An anamorphosing afocal objective comprising positive and negative cylindrical members, both members being corrected for achromatism, the correction being centered at the short wave length end of that portion of the spectrum for which the objective is designed to be used.

28. An objective comprising in combination a positive member and a negative member, said positive and negative members being separately corrected for achromatism, the correction in each case being centered closer to the short wave length end than to the center of that portion of the spectrum for which the objective is designed to be used.

29. An objective comprising in combination a positive member and a negative member, said positive and negative members being separately corrected for achromatism, the correction in each case being centered closer to the short wave length end than to the center of that portion of the spectrum for which the objective is designed to be used and the various chromatic aberrations of the one member being approximately neutralized by those of the other member.

30. A compound objective comprising positive and negative members corrected for achromatism, the objective as a whole being corrected for diagonal rays by centering the correction of the short wave length end of that portion of the spectrum for which the objective is designed to be used, thereby providing lenses which individually are not well corrected but which neutralize each other for paraxial rays and afford correction for diagonal rays.

31. An anamorphosing afocal objective composed of two members, the one positive and the other negative, each member separately achromatized and composed of two cylindrical elements cemented together, the axial planes of all of the cylindrical elements of the objective lying in one and the same plane, in each member the curvature of the cemented surface being substantially less than that curvature which, taken in conjunction with the selected glass constants, the radii of the free surfaces and the lens thicknesses, gives an optimum color correction for the member alone, thus centering the color correction for each member toward the short wave length end of that portion of the spectrum for which the objective is designed to be used and correcting the objective as a whole for achromatism of oblique rays.

32. An anamorphosing afocal objective comprising two cylindrical members, the one positive and the other negative, each separately corrected for achromatism, the correction in each case being centered closer to the short wave length end than to the center of that portion of the spectrum for which the objective is designed to be used, the free surface of the positive member exterior to the objective being positive and having a radius of curvature shorter than that of the interior free surface of the member.

33. An anamorphosing afocal objective composed of two members, one positive and the other negative, each separately achromatized so that the color correction for the distance differences of the second focal point of the positive member and of the first focal point of the negative member is not made as is usual for the region of the spectrum for which the objective is to be used but for a spectral region substantially twice as wide through its extension in the direction of the ultraviolet, thus centering the correction for each member closer to the short wave length end than to the center of that portion of the spectrum for which the objective is designed to be used, the positive and negative members being spaced a distance apart substantially equal to the difference between their absolute focal lengths, whereby the second focal point of the positive member coincides with the first focal point of the negative member, thus locating the image due to the anamorphoser in the same plane as the object, and thus correcting for astigmatism along the axis of the anamorphoser, the negative member having a concave exterior surface, thus correcting for astigmatism of oblique rays.

34. An anamorphosing afocal objective according to claim 33 in which the cambrure of the positive member is positive and not greater in numerical value than the strength in diopters of the positive member.

35. An anamorphosing afocal objective composed of two members, the one positive and the other negative, each member composed of two cylindrical elements cemented together, namely a crown glass element and a flint glass element, the axial planes of all of the cylindrical elements of the objective lying in one and the same plane, in each member the radius of the cemented surface being at least one fifth longer than that radius for which, in conjunction with the selected glass constants, the radii of the free surfaces and the lens thicknesses, in the positive member the second focal point distances and in the negative member the first focal point distances are in each case equal for two marginal colors of the spectrum for which the objective is designed to be used, thus centering the color correction for each member toward the short wave length end of that portion of the spectrum for which the objective is designed to be used.

36. An anamorphosing afocal objective according to claim 35 in which the cambrure of the positive member is positive and not greater in numerical value than the strength in diopters of the positive member.

37. An anamorphosing afocal objective according to claim 35 in which the cambrure of the negative member is negative and less in absolute value than two fifths the absolute value of the strength in diopters of the negative member.

38. An anamorphosing afocal objective according to claim 35 in which the cambrure of the negative member is so chosen that the tangential image surface of the negative member corresponding to its first focal point has substantially the same curvature as the tangential image surface of the positive member corresponding to its second focal point.

39. An anamorphosing afocal objective according to claim 35 in which both free surfaces of the negative member are negative and the radius of curvature of the free surface exterior to the objective is shorter than but not less than one half as long as that of the interior free surface of the member.

40. An anamorphosing cylindrical objective according to claim 18 in which the radius of the cemented surface of each of the two members is approximately one fifth to one third longer than the radius for that member for which the anterior focal distances for that member of the two marginal colors of the useful spectrum are equal.

41. An anamorphosing afocal objective comprising positive and negative cylindrical members, the positive member consisting of a double convex heavy crown glass element and a concavo-convex light flint glass element cemented thereto, the negative member consisting of a concavo-convex light flint glass element and a double concave heavy crown glass element cemented thereto, the index of refraction of the flint glass being equal to or slightly greater than that of the crown glass in each case, both members being corrected for achromatism, the correction being centered at the short wave length end of that portion of the spectrum for which the objective is designed to be used.

42. An anamorphosing afocal objective comprising compound positive and negative cylindrical members, the axial planes of all the elements thereof being in one and the same plane, each member being corrected for achromatism and each composed of two cylindrical elements cemented together in each of which the sign of the cemented surface is opposite to that of the member.

43. An Anamorphosing afocal objective comprising compound positive and negative cylindrical members in each of which the sign of the cemented surface is opposite to that of the member and in each of which the strength of the cemented surface is less than 10% of the total strength of the member.

44. An anamorphosing afocal objective comprising positive and negative compound cylindrical members, both members having tangential focal surfaces of substantially the same absolute curvature whereby the astigmatism of the two members is neutralized, each member being composed of a crown glass element having a greater index of refraction than 1.55 and a flint glass whose index of refraction is from 0 to 2½% greater than that of the crown glass.

45. An anamorphosing afocal objective comprising compound positive and negative cylindrical members each composed of a crown glass element having a greater index of refraction than 1.55 and a flint glass element whose index of refraction is from 0 to 2½% greater than that of the crown glass, the cambrure of the positive member having a numerical value between one-half that of the strength of the member and zero.

46. An anamorphosing objective comprising compound positive and negative cylindrical members in which the strength of the cemented surface of each member is less than 10% of the total strength of the member and in which the astigmatism of the cemented surface of the negative member is less than 20% of the total astigmatism of the member.

47. An anamorphosing afocal objective comprising compound positive and negative cylindrical members each composed of a crown glass element having a greater index of refraction than 1.55 and a flint glass whose index of refraction is from 0 to 2½% greater than that of the crown glass in which the astigmatism of the cemented surface of the negative member is less than 20% of the total astigmatism of the member.

48. An anamorphosing afocal objective comprising compound positive and negative cylindrical members each composed of a crown glass element having a greater index of refraction than 1.55 and a flint glass whose index of refraction is from 0 to 2½% greater than that of the crown glass and in which the cambrure of the positive member is so chosen as to make oblique rays of high and low incidence upon the positive lens emerge at greater angles with the axis of the objective than the corresponding oblique ray of central incidence and with an approximate equality of emergence angle for the useful spectrum.

49. An anamorphosing afocal objective comprising compound positive and negative cylindrical members each composed of a crown glass element having a greater index of refraction than 1.55 and a flint glass whose index of refraction is from 0 to 2½% greater than that of the crown glass and in which all rays of a particular incident bundle of parallel oblique rays emerge at angles whose mean is approximately constant across the spectrum.

50. An anamorphosing afocal objective comprising compound positive and negative cylindrical members each composed of a crown glass element having a greater index of refraction than 1.55 and a flint glass whose index of refraction is from 0 to 2½% greater than that of the crown glass and in which all rays of a particular incident bundle of parallel oblique rays emerge at angles whose mean is approximately constant across the spectrum and in which the spherical aberration of the objective as a whole is negligible.

51. An anamorphosing afocal objective comprising compound positive and negative cylindrical members each composed of a crown glass element and a flint glass element and having the following proportions—

$r_1 = +80.9$ mm.
  $d_1 = 4.5$ mm. Crown
$r_2 = -30.2$ mm.
  $d_2 = 2.6$ mm. Flint
$r_3 = -152.8$ mm.
  interval 27.21 mm.
$r_4 = -80.9$ mm.
  $d_3 = 5.5$ mm. Flint
$r_5 = +19.1$ mm.
  $d_4 = 2.4$ mm. Crown
$r_6 = +65.4$ mm.
Crown $n_d = 1.5606$  $n_C = 1.5578$  $n_F = 1.56696$
Flint $n_d = 1.5737$  $n_C = 1.56961$  $n_F = 1.5834$

HARRY SIDNEY NEWCOMER.